Patented Aug. 15, 1950

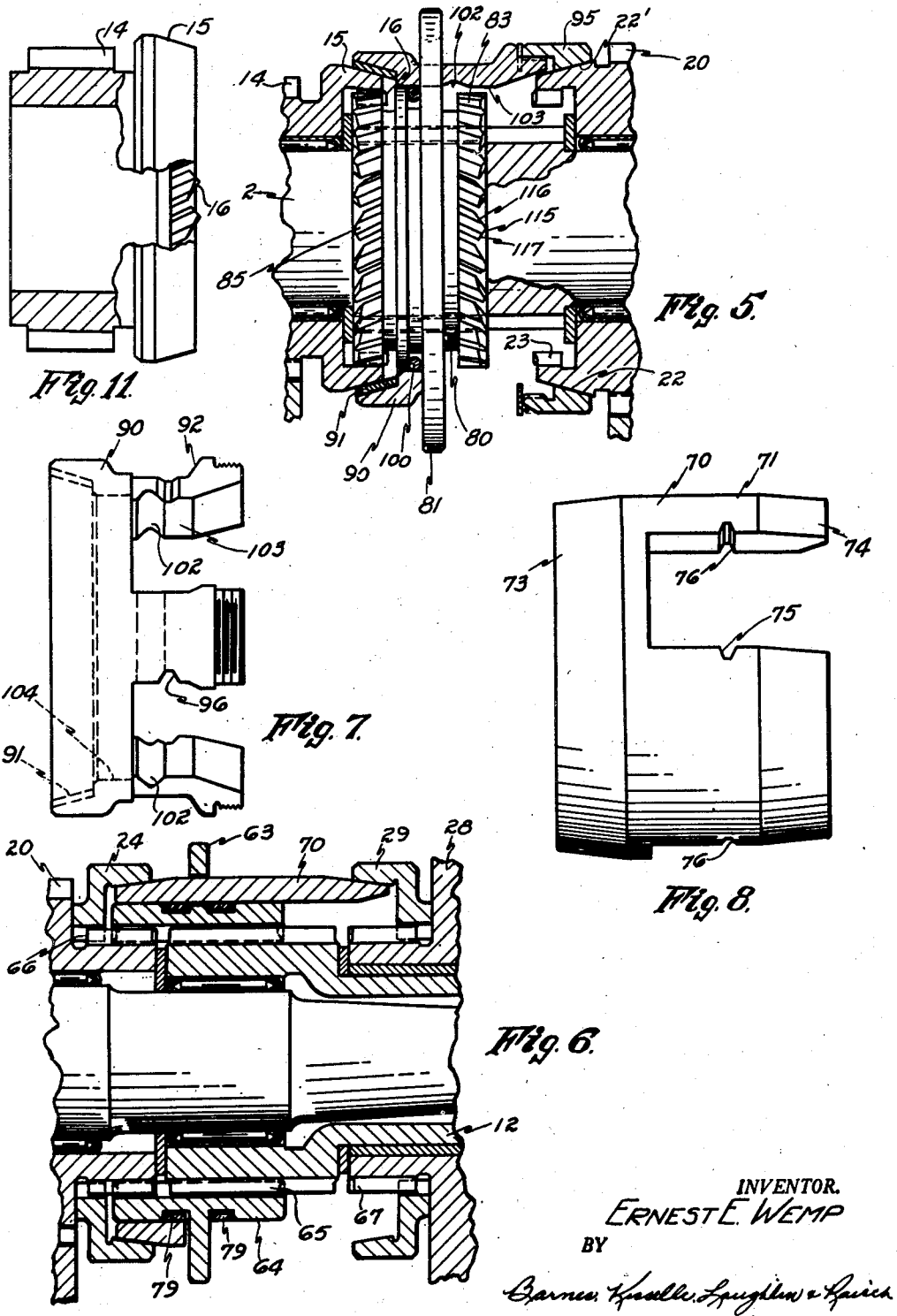

2,518,734

UNITED STATES PATENT OFFICE 2,518,734

SPEED CHANGE TRANSMISSION

Ernest E. Wemp, Detroit, Mich., assignor of five per cent to Eleanor May Wemp, Los Angeles, Calif., five per cent to Leah Kathleen Smith, five per cent to Clyde J. Smith and twenty per cent to Lila A. Wemp, all of Detroit, Mich.

Application November 15, 1944, Serial No. 563,482

1 Claim. (Cl. 192—53)

This invention relates to a transmission for providing a number of gear ratios between driving and driven members. The transmission is one adapted for use in an automotive vehicle and such use may be visualized as the invention is described. The transmission, of course, may be used in other places.

In general, the objects of the invention are to provide an improved transmission capable of being easily operated and, indeed, one which lends itself to automatic or a semi-automatic manner of operation. In this connection, the transmission involves a plurality of shiftable elements for effecting different gear ratios which function in conjunction with each other. One of the shiftable elements is in the nature of a conventional shifting element as is presently used in transmissions for establishing driving connections through different gears or gear sets. Another of the shiftable elements is what may be termed a "power coupling" shiftable to connect different gears or gear sets and the power coupling is one which is operable while the two members which are to be connected by a dental engagement are under torque load. A further object of the invention is to provide a transmission which will not be excessive in cost and which indeed may have a relatively low cost. In this connection, as will be seen later, an adequate number of speed ratios both forward and reverse is provided with a minimum number of gears.

Other objects of the invention will be appreciated as the detailed description is followed in conjunction with the accompanying drawings. These drawings show one form of mechanism for carrying out the invention.

Fig. 4 is a sectional view taken substantially on line 4—4 of Fig. 3 showing the control mechanism for the forward and reverse gear.

Fig. 5 is an enlarged sectional view showing the power coupling in one connected position.

Fig. 6 is an enlarged sectional view showing the synchronizing shifting element in one coupled condition.

Fig. 7 is a view showing the detail of the blocker element of the power coupling.

Fig. 8 is a detail view showing the synchronizing and blocker element of a synchronizing coupling.

Fig. 9 is a developed section taken substantially on line 9—9 of Fig. 2 showing blocker elements of the power coupler.

Fig. 9a is a view similar to Fig. 9 showing the blocker elements in a different position.

Fig. 10 is a developed view taken substantially on line 10—10 of Fig. 3 showing blocker elements of the synchronizing coupling.

Fig. 10a is a view similar to Fig. 10 showing the blocker elements in a different position.

Fig. 10b is a view similar to Figs. 10 and 10a showing the blocker elements in still a different position.

Fig. 11 is a view showing the internal tooth construction on one of the gears.

Figure 1:
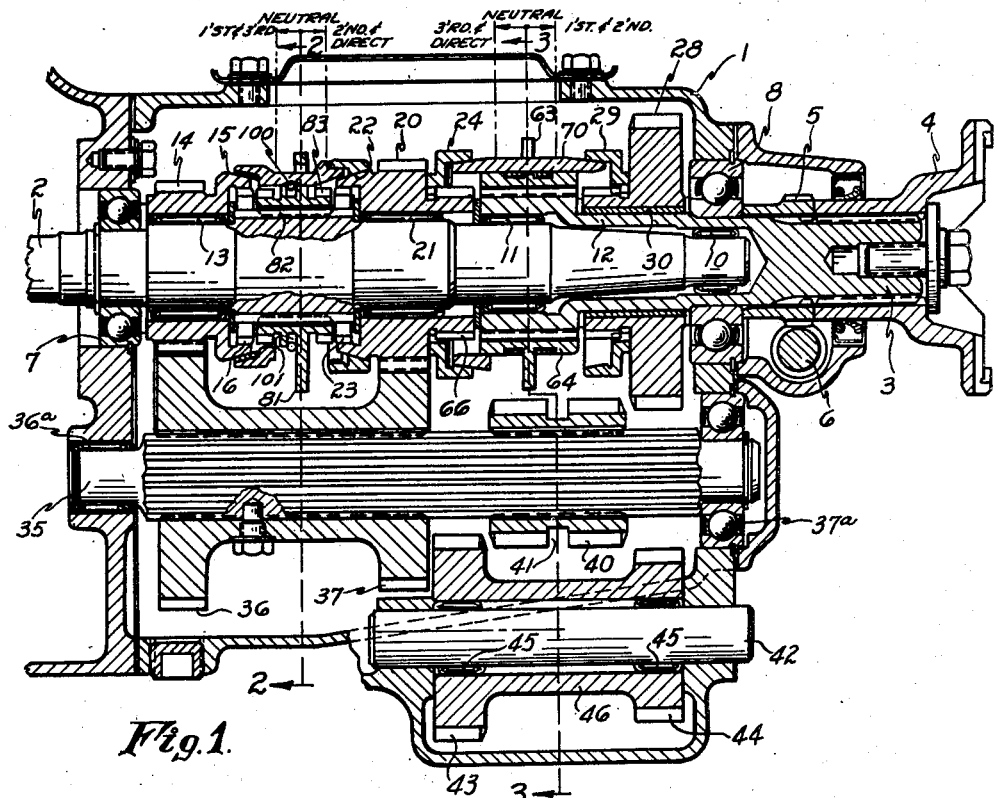
Fig. 1 is a sectional view taken through a transmission constructed in accordance with the invention, showing the same in a neutral position and illustrating the reverse gear shaft swung to a position where it can be seen.

The transmission, as shown in Fig. 1, is provided with a suitable housing 1. The power input shaft is illustrated at 2. This may be a clutch shaft driven by an internal combustion engine. The power output member is generally illustrated at 3 there being a suitable terminal piece 4 thereon which may constitute a part of a universal joint assembly. Secured to the output member 3 may be a worm gear 5 for driving a shaft 6 to provide a power take-off for a speedometer or other device. The input member is suitably journalled in the housing as by means of a bearing 7 while the output member is suitably journalled in a bearing 8.

In the construction shown in Fig. 1 the power input or driving member 2 projects into a sleeve-like part of the power output or driven member 3 and the two members are associated with each other as by means of needle bearings 10 and 11, and the sleeve-like part of the output member is illustrated at 12. Rotatably mounted upon the shaft 2, as by means of needle bearings 13 is a gear 14 having an extension with a conical exterior surface 15 and internal teeth 16. A gear 20 is rotatably mounted on the shaft 2 as by means of needle bearings 21 and this gear has an extension with a conical exterior, shown at 22, and which is provided with internal teeth 23. Secured to the gear 20 is a ring 24 having an internal frictional face as illustrated.

Rotatably mounted upon the driven member 3 is a gear 28. Secured to the gear 28 is a ring 29 with an internal friction face. A suitable bearing 30 may be used for mounting the gear 28. There is a splined counter shaft 35 journalled in the housing as at 36a and 37a and upon this shaft is a gear 36 and a gear 37. These two gears may be formed from an integral piece as illustrated. The teeth of gear 36 mesh with the teeth of gear 14 and the teeth of gear 37 mesh with the teeth of the gear 20. Another gear 40 is disposed on the shaft 35 so that it can be axially shifted and this gear has a groove 41 for receiving a shifter member. There is a shaft 42, which may be termed a reverse gear shaft, mounted in the housing and journalled upon which is a double gear element having a gear 43 and a gear 44. This element may be journalled by needle bearings 45. As shown in Fig. 1, the reverse gear shaft 42 and the gear element 46 thereon are swung out of position so that they can readily be seen. But, it is to be understood that the teeth of gear 44 mesh constantly with the teeth of gear 28. This will be appreciated by reference to Fig. 3 where the several shafts are shown in their correct relative positions.

This gearing arrangement, as shown, is arranged to provide four speeds forward and two speeds in reverse. Suitable shiftable means for establishing dental engagements are provided for this purpose but before proceeding with a description of this means it is thought that the matter would be clarified by tracing the various operating paths through the transmission. For first or low speed: The drive shaft 2 is coupled to the gear 14 which, through gear 36, drives countershaft 35; the teeth of gear 40 are meshed with those of gear 28 and gear 28 is coupled with the output or driven shaft 3. For second speed: The drive shaft is coupled to gear 20 which, through gear 37, drives countershaft 35 and gear 40 thereon is engaged with gear 28 which is coupled to the driven shaft 3. For third speed: Drive shaft 2 is coupled to gear 14 which, through gear 36, drives countershaft 35; gear 37 drives gear 20 and gear 20 is coupled to the driven shaft 3. For fourth or direct speed: Drive shaft 2 is coupled to the gear 20 and gear 20 is coupled to the driven shaft 3 so that, as a result, there is a direct connection between shafts 2 and 3. For reverse, the gear 40 is shifted for dental engagement with gear 43 and this transmits torque to gear 28 since gear 44 and gear 28 have their gear teeth constantly in mesh, and gear 28 is coupled to the driven shaft. The two speeds in reverse can be obtained by selectively coupling the gear 14 and the gear 20 to the driving shaft 2.

Figure 3:
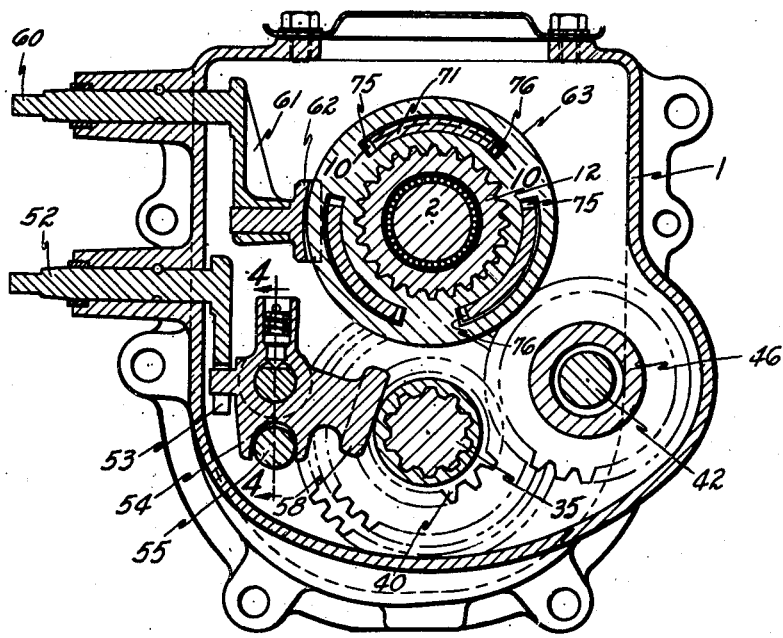
Fig. 3 is a sectional view taken substantially on line 3—3 of Fig. 1 showing the control for the synchronizing type of coupling.

The shifting means for the gear 40 is shown in Figs. 3 and 4 and resides in a shiftable element 50 slidable upon a rod 51 and moved by a rockable control element 52 with a crank arm 53 connected to the shiftable element 50. The shiftable element has a fork 54 slidably engaging a stabilizing rod 55 and a shoe 58 engaging the groove 41. A detent arrangement residing in a spring pressed plunger 56 and three notches 57 in the rod 51 holds the gear 40 in any one of three positions. As shown in Figs. 1 and 4 the gear 40 is in neutral position. When shifted to the right as Fig. 1 is viewed, the gear 40 dentally engages the gear 28 and when shifted to the left it dentally engages the gear 43. Any suitable control means positioned for convenient manipulation may be connected to the member 52.

The means for selectively coupling the gears 20 and 28 to the driven shaft is shown in Figs. 3 and 6. A controlling element 60 has a crank arm 61 with a shoe 62 associated with the flange 63 of a shiftable coupler 64 which has a splined connection as at 65 with the sleeve portion 12 of the driven shaft 3. The coupler 64 is axially shiftable on the splines. Suitable control means may be attached to the element 60 for operating the same. The gears 20 and 28 are provided with teeth 66 and 67 arranged to be dentally engaged selectively by the splines on the coupler 64. In Fig. 1 the coupler 64 is in a neutral position where it does not engage either gear 20 or gear 28. In Fig. 6 the coupler has been shifted to engage with the gear 20. The splines 65 and the teeth 66 and 67 are preferably straight.

A synchronizing member 70 slidably fits over the coupler 64. This synchronizer is of a spider construction with a full ring-like section at one end and with fingers 71 projecting through slots 72 in the flange of the coupler. This synchronizing member has tapered or coned surfaces 73 and 74 for frictionally engaging the internal surfaces of the members 24 and 29. There is a frictional engagement between the coupler and the synchronizing member provided by two expanding springs 79 disposed in recesses in the coupler and expanding into frictional engagement with the synchronizing member 70. When the coupler 64 is shifted to the left as Fig. 1 is viewed, the surface 73 frictionally engages the member 24 and thereby tends to synchronize the speed of rotation of the gear 20 and the driven shaft 3. In making the dental engagement the coupler 64 slides frictionally within the synchronizing member 70. Fig. 6 shows the coupler 64 coupled to the gear 20 with the splines on the coupler and the teeth 66 in dental engagement. When the coupler 64 is moved to the right, as Fig. 1 is viewed, the surface 74 engages the member 29 and synchronizes the gear 28 to the speed of rotation of the shaft 3. When the coupler is so shifted to the right the splines on the coupler dentally engage with the teeth 67 and thereby couple the gear 28 to the driven shaft. Normally, the synchronizing element 70 is arranged to have a running clearance with the members 24 and 29. It will be understood that when the coupler is in the position shown in Fig. 6 the gear 20 is coupled to the driven shaft, and that when it is shifted to the right as Fig. 1 is viewed, the gear 28 is coupled to the driven shaft.

There is a blocking arrangement effected by an interengagement between the arms 71 of the synchronizing element and the coupler 64. As shown in Fig. 8, the arms 71 are provided with recesses on opposite faces as shown at 75 and 76. The metal defining the openings in the flange 63 is suitably shaped to provide inter-engaging portions 77 and 78 for lockingly engaging in the recesses. The different positions are shown in Figs. 10, 10a, and 10b, and these positions are obtained by the relative rotary motion of the parts.

As above described, it will be remembered that in the second speed ratio the gear 20 is coupled to the drive shaft 2 and the gear 28 is coupled to the driven shaft 3 through the inter-engagement of the splines on the coupler 64 with the teeth 67 and the splines on the driven shaft. The torque is transmitted through gear 20, gear 37, gear 40 to gear 28, and due to the gear reduction the gear 20 is rotating faster than gear 28. When a shift is made to the third speed ratio gear 20 is released from the driving shaft and the coupler 64 is moved to uncouple the gear 28 and to couple the gear 20 to the driven shaft. The torque is transmitted, in the third speed ratio through gear 14, gear 36, gear 37 to gear 20. When the coupler 64 is shifted to release gear 28, and is in the intermediate position as shown in Fig. 1, the gear 20 is rotating faster than gear 28 and, therefore, faster than the coupler 64 and the synchronizing element 70. As Fig. 3 is viewed, the rotation of the shaft 2 is counter-clockwise. As the synchronizing element comes into frictional engagement with the part 24 it is moved clockwise relative to the coupler 64. This, as depicted in Fig. 10, causes the synchronizing element 70 to move upwardly, as Fig. 10 is viewed, and when the coupler 64 becomes centrally disposed or, in other words, in neutral position as shown in Fig. 1, the blocking edge 77 will shift into the notch 75. This condition will continue so long as there is different relative rotation and, accordingly, the coupler 64 is blocked and cannot move further to the left. This holds the coupler in the neutral position shown in Fig. 1. But gear 20 has been released from the drive shaft and the frictional engagement between the part 24 and the surface 73 is decelerating the gear 20. When it decelerates to a point where it is substantially synchronized with the driven shaft and, therefore, the coupler 64, there is no relative motion and the parts are free to assume a position as shown in Fig. 10a. It will be observed that the inter-engaging blocking elements 75 and 77 have a tapered interengagement so that the axial force on the coupler may aid in causing the parts to move into the relative position shown in the Fig. 10 to the relative position shown in Fig. 10b. At this moment, the axial movement of the coupler 64 may be continued to complete the dental engagement with the gear 20.

When a shift is to be made to establish a coupling with the gear 28 the action is the same, except the relative direction of rotation is opposite. In other words, the gear 28 is rotating at a lower speed than gear 20 and, therefore, a lower speed than the coupler 64 and the synchronizer 70. Accordingly, when the synchronizer engages the element 29 it is rocked clockwise relative to the coupler 64 and, as Fig. 3 is viewed, and as illustrated in Fig. 10b, there is an interengagement between the notches 76 and blocking edges 78. This prevents further shift of the coupler element until the coupler element 64 and the gear 28 are substantially synchronized so that there is substantially no relative rotation at which time the coupler element 64 may be shifted to the right to establish a connection with the teeth 67 of the gear 28.

In both instances, that is in both directions of shift, it will be observed that the shiftable coupler is blocked in a neutral position because of a blocking action incident to and caused by relative rotation of the parts about to be dentally engaged. When the parts become substantially synchronized, however, the blocking action ceases so that a coupling may be established. A number of factors necessarily play a part in this operation. These include the amount or extent of the friction exerted by the synchronizing element 70, the amount of the axial load on the coupler element 64 and the angularity of the interengaging locking elements 75 and 77 or 76 and 78, and the relative movement of the parts about to be synchronized. An increase in the axial load on the coupler 64 increases the frictional load between the gear and synchronizing element 70 because of the inter-engaging blocking elements. The force with which the blocking elements are held interengaged is dependent somewhat on the frictional load between the synchronizing element and the gear engaged thereby and by the speed of relative rotation. These factors can be so organized that a dental engagement is finally made upon the synchronizing of the parts so that a silent dental engagement may be effected.

The coupler situated between the gears 14 and 20 is a different type of coupler and is one which may be called a power coupler, in that it may be coupled to driving and driven members relatively while both are under torque load. The shifter element or coupler is illustrated at 80 and it has a flange 81. This coupler has a spline connection 82 with the driving shaft 2. These splines are straight and the coupler may shift axially thereon. The coupler has a set of teeth 83 for engagement with the set of internal teeth 23 on the gear 20, and a set of teeth 85 for dental engagement with the set of internal teeth 16 on the gear 14.

There is a blocking element positioned over the coupler. This element is shown in Fig. 7, has a ring-like body 90 with an internal face which may be provided with suitable friction material 91 for frictionally engaging the part 15 of the gear 14. Projecting from the body are fingers 92 which extend through slots 84 in the flange 81. A ring of suitable friction material, as shown at 95, is screw threaded upon the ends of the fingers and held locked in position and this ring has an internal face for frictionally engaging the part 22 of the gear 20.

As shown in Figs. 7, 9, and 9a, each finger 92 has a notch 96 shaped to receive a cooperating edge 97 of the metal defining one side of the slot 84, the function of which will be presently described. The shiftable coupler 80 and the blocking element 90 are frictionally associated through the means of an expanding spring 100 disposed in a circumferential groove 101 and arranged to expand and frictionally engage the internal peripheral surfaces of the member 90 and its fingers 92. At its intermediate portion, the element 90 is provided with an internal recess formation in which the expanding spring 100 engages, this recess or notch formation being illustrated at 102. As illustrated in Fig. 7, the intermediate portion of this member falls at a location of the fingers 92 and, therefore, in reality each finger has a notch 102 although they function as one. On each side of the notch formation is an internal axial surface 103 and 104.

When the coupling 80 and the synchronizing element 90 are relatively centrally positioned, the expanding spring engages in the notch formation 102 and, of course, also lies partially in the groove 101. When the coupler 80 and the synchronizing element 90 are shifted relatively axially the expanding spring is partially collapsed as it moves out of the recess formation and is forced into the groove 101 and frictionally engages against either the surface 103 or the surface 104 depending upon the relative direction of shift.

Figure 2:
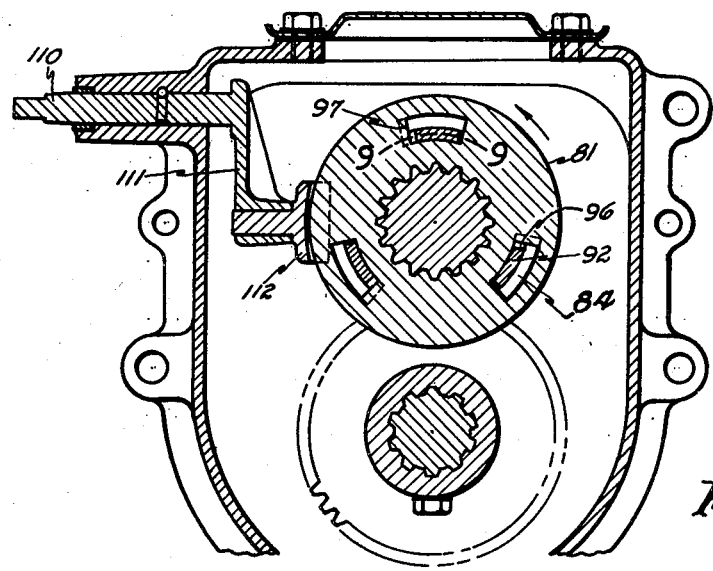
Fig. 2 is a sectional view taken substantially on line 2—2 of Fig. 1 illustrating the control for the power coupling.

The control for the power coupler resides in a rock shaft 110 as shown in Fig. 2 which has an arm 111 coupled to a shoe 112 which engages the flange 81. Any suitable operating element may be attached to the control 110 and disposed in a convenient location.

The dentally engaging set of teeth 85 and 16 and the dentally engaging set of teeth 83 and 23 are angularly disposed helically relative to each other as shown in Figs. 5 and 11. The teeth of each group are similarly formed and are chamfered so as to provide a relatively pointed or sharp edge 115 for facilitating the start of the dental engagement. One edge of each tooth has a relatively long chamfer or facet 116 while one has a shorter facet 117. The internal teeth 16 on the gear 14 are shown in Fig. 11 and those on the gear 20 are of similar construction. The teeth 85 on the coupler element 80 have a left hand helical formation and the teeth 16 on the gear 14 are correspondingly made to interfit therewith. The teeth 83 have a right hand helical formation and the teeth 23 on gear 20 are made to correspond and dentally engage therewith.

The operation of this power coupler for selectively coupling the gear 14 and the gear 20 to the drive shaft 2 operates as follows: First, it will be appreciated that when the teeth 16 and 85 are coupled that the gear 14 is coupled to the drive shaft; when the teeth 83 and 23 are coupled that the gear 20 is connected to the drive shaft. In the intermediate or neutral position, shown in Fig. 1, there is no connection and the expanding spring 100 rides in the recess formation 102. An axial force on the coupler 80 to the left places an axial load to the left on the synchronizing and blocking element 90 so that it frictionally engages the portion 15 of the gear 14. This is accomplished by the spring 100. This axial load on the member 90 is at its maximum as the spring rides out of the inclined wall structure of the recess formation. If an axial load is placed on the coupler to the right, the member 90 is urged to the right and the ring 95 frictionally engages the portion 22 of the gear 20. Eventually, the coupler is shifted to the right and the spring rides out of the recess formation and engages the surface 103. It will be understood that the element 90 has a suitable running clearance so that it can run free of the gears 14 and 20.

Consider, now, that the coupler 80 is connected to the gear 14 as shown in Fig. 5. In this condition, and with the shaft 2 transmitting the torque to shaft 3, the coupler becomes a driving member and the gear 14 a driven member. The direction of rotation is clockwise as Fig. 5 is viewed from the left. Accordingly, torque delivered from the shaft 2 causes an accepting tendency for the dentally engaging teeth 16 and 85. In other words, it has a tendency to shift the coupling element 80 further to the left. Upon torque reversal, by which we mean that the driven shaft transmits driving torque to the shaft 2, the helical formation of the teeth causes a tendency to reject or, in other words, places an axial load on the coupling element 80 tending to shift it to the right. The helical angle, however, is such that combined loads on the dentally engaging teeth 16 and 85 and the loads on the splines 82 substantially balance the thrust which tends to break the dental engagement so that there is no disengagement upon this torque reversal.

When the throttle of the engine is cut so that there is a torque reversal, and an axial force is applied to the coupler through the controlling element 110, the coupler 80 is shifted to the right to disengage the teeth. This can occur only by some relative rotation between the gear 14 and the shaft 2 since the coupler rotates uniformly with the shaft due to the straight splines 82, and the gear 14 must be caused to slightly overrun the coupler as the helical teeth are sliding out of dental engagement. If this shift is made when the parts are in first speed, the gear 14 is coupled to the shaft 3 through the gear 36, shaft 35, gear 40, gear 28 and the coupling provided by the teeth 65 and 67. At this time the gear 20 is being rotated by the gear 37 and, therefore, gear 20 is rotating at a speed lower than the speed of the rotation of the shaft 2 at the moment of the disengagement of the teeth 16 and 85. However, the gear 20 continues to rotate uniformly with vehicle movement whereas the shaft 2 quickly decelerates upon deceleration of the engine to a speed below that of a gear 20 and the friction load by the engagement of the surface 22 of the gear 20 and the ring 95 oscillates the blocking element 90 relative to the coupler with the result that the locking edges 97 engage in the recesses 96 as shown in Fig. 9a and the coupler 80 is therefore locked in the intermediate position shown in Fig. 1. This condition will remain so long as the shaft 2 and the engine are rotating lower than the speed of rotation of the gear 20 as, for example, when the engine is near idling speed. Upon acceleration of the engine, however, it first comes up to the speed of the gear 20 and then tends to overrun the gear 20 and the synchronizing element 90 is shifted back to a condition shown in Fig. 9, thus disengaging the blocking elements 96 and 97 as shown in Fig. 9. At this moment, realizing that there is an axial force to the right on the coupler 80, the coupler is free to move to the right and the teeth 83 become dentally engaged with teeth 23. In this action the coupler teeth enter into engagement with the gear 20 with a screw-like action and shaft 2 slightly overruns the gear 20 during the time interval when the teeth are sliding into full dental engagement. When torque is delivered from the driving member the angle of the teeth 83 and 23 tend to cause an acceptance or, in other words, place an axial load on the coupling element 80 to the right; upon torque reversal the tendency is to reject or, in other words, to shift the coupler to the left but this does not occur as it is substantially balanced and overcome by the combined loads by the dentally engaging teeth 23 and 83 and the splines 82.

In considering the shift of the coupler to the left, an axial force is placed thereon and it is shifted to disengage the teeth 23 and 83 and at this time it is rotating at a speed which is lower than the speed of rotation of the gear 14. Accordingly, the frictional engagement of the member 90 with the part 15 causes the blocking element to inter-engage and lock as shown in Fig. 9a. When the speed of the engine and drive shaft 2 are accelerated so that they tend to overrun the gear 14, or if the gear 14 decelerates tending to underrun the shaft 2, the blocking arrangement shown in Fig. 9a is released and a condition exists as shown in Fig. 9. The coupler element 80 may be shifted to the left to engage the teeth 16 and 85. As the teeth 16 and 85 are shifting into dental engagement the shaft 2 and the coupler must slightly overrun the gear since the coupler rotates uniformly with the shaft and must move into dental engagement on the helix. The connection with the gear 14 may be made while this gear is coupled to the driven shaft 3 either through the lower gear train residing in the gear 28, gear 40 and shaft 35, or through the gear 20, gear 37 and shaft 35, depending upon whether the coupling member 64 is connecting the shaft 3 with the gear 28 or gear 20.

It is thought to be well to repeat the description of the various gear ratios in the transmission in the light of the operation of both of the couplers. As shown in Fig. 1, both couplers are in neutral. The first speed is established when the coupler 80 is connected to the gear 14 and the coupler 64 is connected to the gear 28. Torque is then transmitted through the transmission by the following elements: Shaft 2, coupler 80, gear 14, gear 36, shaft 35, gear 40, gear 28, coupler 64, to shaft 3. The second gear ratio is established when the coupler 80 is connected to the gear 20 and the transmission line is as follows: Shaft 2, coupler 80, gear 20, gear 37, gear 40, gear 28, coupler 64 to shaft 3. The third speed is established when the coupler 80 is connected to the gear 14 and coupler 64 is connected to gear 20; in this case the torque line is from shaft 2, coupler 80, gear 14, gear 36, gear 37, gear 20, coupler 64 to shaft 3. Fourth speed is established when the coupler 80 is connected to gear 20 and the coupler 64 is connected to the gear 20; in this condition there is a direct transmission of power from the shaft 2 to coupler 80 to gear 20 to coupler 64 to shaft 3.

Reverse speeds are accomplished by shifting the gear 40 out of engagement with gear 28 and into engagement with gear 43, it being remembered that gear 44 is constantly connected to gear 28. The torque may be transmitted to shaft 35 either from gear 14 or gear 20 and the reverse torque line continues through gear 43, gear 44, to gear 28 to coupler 64 and to shaft 3. The coupler 64 must be connected to gear 28 for reverse action.

Thus, the transmission, aside from the reverse gear arrangement, has two shiftable coupling elements, one of which is a synchronizing type and the other of which is a power coupler type, and the two positions of these two couplers are combined to provide four combinations for four speeds.

I claim:

In a torque transmitting apparatus for connecting a driving member and a driven member at different speed ratios and operable to change the ratio while both members remain connected respectively to driving and driven mechanisms and both members are under torque load, two axially spaced elements connected to one of the members at different speed ratios, a coupler slidably connected to the other member and disposed between the two said elements, co-operating teeth on one element and the coupler arranged to be dentally engaged and disengaged, co-operating teeth on the other element and coupler arranged to be dentally engaged and disengaged, said coupler having an intermediate position where both sets of teeth are disengaged, the first mentioned co-operating teeth being disposed helically in a right hand manner, the second mentioned cooperating teeth being disposed helically in a left hand manner, the right and left helical angle of the cooperating teeth being such that the axial thrust on the coupler caused thereby upon the transmission of torque is insufficient to overcome the combined loads on the engaged teeth and on the slidable connection of the coupler, whereby dentally engaged teeth remain engaged upon torque reversal, means for applying an axial force on the coupler for shifting the same axially to and from positions of dental engagement with the said two elements, and blocking means rendered effective by relative rotation between the coupler and the element toward which the coupler is being urged by said means for blocking movement of the coupler toward said element and which is releasable as the relative rotation reverses for continued movement of the coupler toward the element to establish the dental engagement, the helical direction of said teeth on the coupler and on said two elements being such as to accept engagement as the helical teeth on the coupler are moved into dental engagement with each element.

ERNEST E. WEMP.

REFERENCES CITED

The following references are of record in the file of this patent:

UNITED STATES PATENTS

| Number | Name | Date |
| --- | --- | --- |
| 1,780,460 | Burtnett | Nov. 4, 1930 |
| 1,949,167 | Maybach | Feb. 27, 1934 |
| 2,106,841 | Griswold | Feb. 1, 1938 |
| 2,110,964 | Ridgeway | Mar. 15, 1938 |
| 2,131,199 | Tenney | Sept. 27, 1938 |
| 2,221,893 | White | Nov. 19, 1940 |
| 2,238,370 | Peterson | Apr. 15, 1941 |
| 2,248,134 | Snow | July 8, 1941 |
| 2,320,757 | Sinclair et al. | June 1, 1943 |
| 2,322,970 | Robbins | June 29, 1943 |